E. TODD.
BOILER-PATCH.
APPLICATION FILED SEPT. 16, 1919.
1,327,846.
Patented Jan. 13, 1920.
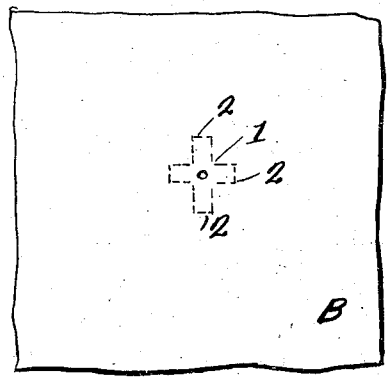
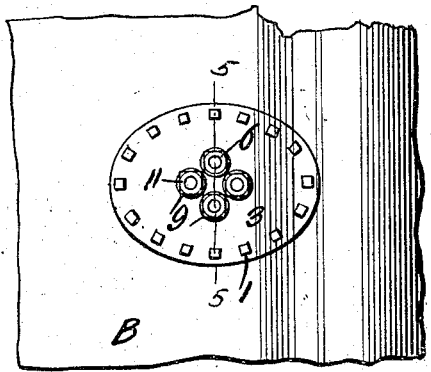
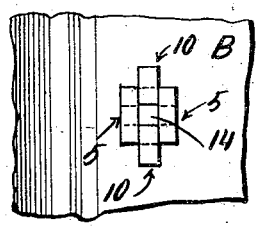
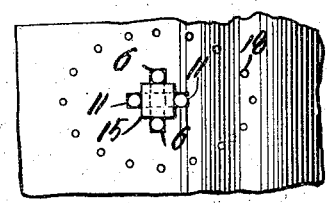
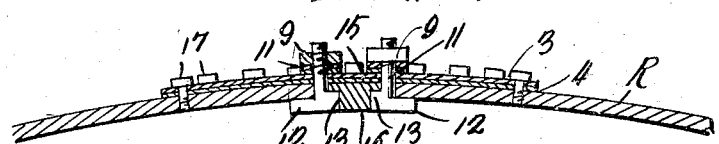
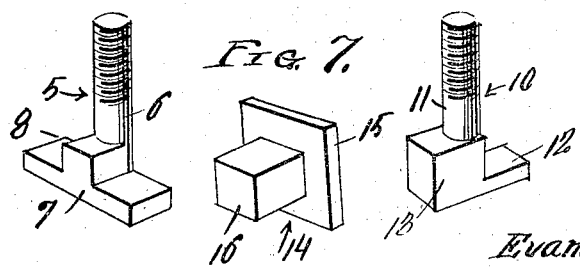
Inventor
Evander Todd

UNITED STATES PATENT OFFICE.

EVANDER TODD, OF WINN, ALABAMA.

BOILER-PATCH.

1,327,846.                Specification of Letters Patent.      Patented Jan. 13, 1920.

Application filed September 16, 1919. Serial No. 324,173.

*To all whom it may concern:*

Be it known that I, EVANDER TODD, a citizen of the United States, residing at Winn, in the county of Clarke and State of Alabama, have invented certain new and useful Improvements in Boiler-Patches, of which the following is a specification.

This invention relates to patches for small holes in iron boilers.

The object of the invention is to provide simple and efficient means for closing the small holes in a boiler flue sheet without removing or interfering with the man hole cover, and for patching the hole in any similar place where there is no opening to permit insertion of the operator's hand or a patch.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a plan view of a portion of a boiler showing the opening therein in full lines such as is formed by rust or the like, and dotted lines indicating the shape of the hole after it has been prepared for patching, Fig. 2 is a similar view showing the patch after it has been applied, Fig. 3 is a similar view taken from inside the boiler, Fig. 4 is a top plan view showing the bolts and plug in position before the application of the patch proper, Fig. 5 is a transverse section taken on the line 5—5 of Fig. 2, Fig. 6 is a detail perspective view of one of the bolts used in forming the patch, Fig. 7 is a similar view of the plug, and Fig. 8 is a similar view of one of the other bolts.

In the embodiment illustrated, a portion of a boiler B is shown having a hole 1 shown in Fig. 1, such as is ordinarily formed by rust, and which is usually circular in configuration. To plug this hole in accordance with this invention, it is first necessary to elongate the aperture and then square out the corners as shown at 2 to receive the bolts shown in Figs. 6 and 8, four of which are employed when the aperture is made in the form shown in Fig. 1, two of the same kind being used at two oppositely disposed corners and two of the other kind at the other corners as will be presently more fully described. Over this reamed out aperture is employed a patch 3 of suitable metal with a gasket or packing 4 arranged between it and the boiler B and which is held in place by bolts 17 as hereinafter described.

The bolts used as leak stoppers for closing the opening 1 are shown at 5 and 10 in Figs. 6 and 8, two of the bolts 5 being employed, and two of the bolts 10. The bolt 5 has a shank 6 which is threaded for the reception of a securing nut 9 and the head 7 thereof is substantially like that of a T-bolt, except that it is arranged at one side of the shank 6 and has a shoulder 8 extending laterally from the shank at its junction with the head.

The bolt 10 has a shank 11 similar to that 6 of the other bolt and is provided at one side with a laterally extending lip 12 and at its diametrically opposite side with a shoulder 13 of a thickness corresponding to the shoulder 8 of the bolts 5.

After the aperture 1 has been cut out as shown in dotted lines in Fig. 1, two of the bolts 5 have the heads thereof inserted through the aperture and positioned with the ends of said heads on opposite sides of two apertures as is shown clearly in Fig. 3, the ends of said head extending some distance beyond the edges of the opening. Two other bolts 10 are then inserted similarly with their lips 12 extending in opposite directions over the inner face of the boiler B and when so positioned, the plug 14 is inserted in the space between the bolts. This plug is constructed as shown in Fig. 7, having a rectangular face plate 15 with a squared shank 16 depending from its lower face, and this shank is arranged between the sides or outer faces of the shoulders 8 and 13 with the plate 15 engaging the upper faces of said shoulders as is shown clearly in Fig. 5. After the bolts and plugs have been so positioned which will be observed is accomplished without inserting the hand in the boiler, the packing 4 is placed over the shanks of the bolts 5 and 10 and the sheet metal patch 3, similarly shaped, being preferably made oval in formation is inserted over the packing. Nuts 9 are then engaged with the threaded portions of the shanks 6 and 11 of the bolts 5 and 10 and screwed home thereby clampingly securing the patch and its packing over the aperture. After these nuts have been tightened, the patch, packing and the boiler B have holes drilled therein to receive the securing bolts 17, the openings in the boiler being threaded for this purpose as is shown clearly in Fig. 5.

The packing 4 may be of any suitable water repellent and semi-resisting material, so that when the patch is tightened up in the manner above described, the opening 1 will be securely closed against all possible leakage of either steam or water, and thus the life of the boiler is greatly prolonged.

From the foregoing description, taken in connection with the accompanying drawings, the advantages of the construction and of the method of operation will be readily apparent to those skilled in the art to which the invention appertains, and while I have described the principle of operation of the invention together with the device which I now consider to be the best embodiment thereof, I desire to have it understood that the device shown is merely illustrative and that such changes may be made as are within the scope of the claimed invention.

Having thus fully described my invention, what I claim as new and desire to secure by Letters Patent, is:

1. A boiler patch comprising a plurality of bolts having angular extension heads to fit the inner faces of the boiler to be patched, and a plug shaped to be inserted between and to close the space between the bolts.

2. A boiler patch comprising a plurality of headed bolts having shoulders on their inner faces, a plug comprising a shank shaped to fit between the bolts with a face plate projecting laterally beyond said shank and adapted to rest on the inner faces of the shoulders of the bolts, and means for securing these parts in operative position.

3. A boiler patch comprising a plurality of bolts having laterally extending heads, a plug for insertion between said bolts, a water and steam proof packing for insertion outside said boiler over said bolts, and a metal plate for clampingly securing said packing to the boiler.

4. A boiler patch comprising a plurality of bolts having heads extending laterally from one side, with shoulders on the inner faces of said heads, a plug for insertion between said bolts, comprising an angular shank with the face plate extending laterally beyond the shank, said plate being designed to rest on the shoulders of the bolts when in operative relation with the shank thereof extending between the bolts, and means for securing the bolts and plug in operative position.

5. The combination with a boiler having an aperture therein, headed bolts for insertion through said apertures with their heads positioned to overlap the walls of the aperture on the inner face of the boiler, a plug for insertion between the bolts, and means for securing the plug and bolts in operative position.

6. A boiler patch comprising a plurality of bolts, some of which have T-shaped heads arranged at one side thereof with a shoulder on the inner face of said head adjacent its connection with the bolt, other of said bolts having a laterally extending lip on one side and a shoulder on the other, the shoulders of both kinds of bolts being of the same height, and a plug shaped to fit between the shoulders of the bolts and having a head for resting on the inner faces of said shoulders.

In testimony whereof I affix my signature in presence of two witnesses.

EVANDER TODD.

Witnesses:
 LENN HOWZE,
 BILL OLEIVER.